United States Patent
Mohanty et al.

(10) Patent No.: US 9,920,198 B2
(45) Date of Patent: Mar. 20, 2018

(54) DURABLE HIGH PERFORMANCE HEAT RESISTANT POLYCARBONATE (PC) AND POLYLACTIDE (PLA) BLENDS AND COMPOSITIONS AND METHODS OF MAKING THOSE

(71) Applicant: University of Guelph, Guelph (CA)

(72) Inventors: Amar K. Mohanty, Guelph (CA); Yury Yuryev, Guelph (CA); Manjusri Misra, Guelph (CA)

( * ) Notice: Subject to any disclaimer, the term of this patent is extended or adjusted under 35 U.S.C. 154(b) by 0 days.

(21) Appl. No.: 15/148,704

(22) Filed: May 6, 2016

(65) Prior Publication Data

US 2016/0326367 A1 Nov. 10, 2016

Related U.S. Application Data

(60) Provisional application No. 62/158,156, filed on May 7, 2015.

(51) Int. Cl.
*C08L 69/00* (2006.01)
*C08K 3/26* (2006.01)

(52) U.S. Cl.
CPC ........ *C08L 69/00* (2013.01); *C08K 2003/265* (2013.01)

(58) Field of Classification Search
CPC .................................................... C08L 69/00
See application file for complete search history.

(56) References Cited

U.S. PATENT DOCUMENTS

| | | | |
|---|---|---|---|
| 5,952,450 A | 9/1999 | Ishihara et al. | |
| 2012/0196997 A1* | 8/2012 | Lu .................. | C08G 81/027 526/273 |
| 2013/0137804 A1 | 5/2013 | Juikar et al. | |
| 2014/0179817 A1* | 6/2014 | Morizur ............. | C08G 64/045 521/180 |
| 2014/0200295 A1 | 7/2014 | Liu | |
| 2014/0235740 A1 | 8/2014 | Liu | |

FOREIGN PATENT DOCUMENTS

| EP | 2060606 A4 | 10/2012 |
|---|---|---|
| JP | 2009051989 A | 3/2009 |

OTHER PUBLICATIONS

Y. Srithep et al., Processing and characterization of poly(lactic acid) blended with polycarbonate and chain extender, J. Polym. Eng. 2014; 34(7): 665-72.*

Wang Y.; Chiao S.M.; Lai M.-T.; Yang S.-Y.; The role of polycarbonate molecular weight in the poly(L-lactide) blends compatibilized with poly(butylene succinate-co-L-lactate). Polymer Engineering and Science, 2013, 1171-1180, 53, 2013 Wiley Periodicals Inc.

Wang Y.; Chiao S.M.; Lai M.-T.; Yang S.-Y; Improvement in toughness and heat resistance of poly(lactic acid)/polycarbonate blend through twin-screw blending: Influence of compatibilizer type. Journal of Applied Polymer Science, 2012, E402-E412, 125, 2012 Wiley Periodicals Inc.

Phuong VT,; Coltelli M.-B.; Cinelli P.; Cifelli M.; Verstichel S.; Lazzeri A. Compatibilization and property enhancement of poly(lactic acid)/polycarbonate blends through triacetin-mediated interchange reactions in the melt. Polymer, 2014, 4498-4513, 55, 2014 Elsevier Ltd.

Hashima K.; Nishitsuhi S.; Inoue T. Structure-properties of supertough PLA alloy with excellent heat resistance. Polymer, 2010, 3934-3939, 51, 2010 Elsevier Ltd.

Lee JB.; Lee YK.; Choi Gd.; Na S. W.; Park TS, Kim W.N. Compatibilizing effects for improving mechanical properies of biodegradable poly (lactic acid) and polycarbonate blends. Polymer Degradation and Stability, 2011, 553-560, 96, 2011 Elsevier Ltd.

Srithep Y.; Rungseesantivanon W.; Hararak B.; Suchiva K. Processing and characterization of poly(lactic acid) blended with polycarbonate and chain extender. J Polym Eng, 2014, 665-672, 34(7), 2014 De Gruyter GmBH.

Harris, A.M.; Lee, E C Durability of Polylactide-Based Polymer Blends for Injection Molded Applications, Journal of Applied Polymer Science, 2013, 2136-2144, 128, 2012 Wiley Periodicals Inc.

* cited by examiner

*Primary Examiner* — Robert Harlan
(74) *Attorney, Agent, or Firm* — Eduardo Krupnik (57) ABSTRACT

A polycarbonate (PC) and poly(lactic acid) (PLA) blend comprising (a) Bisphenol A PC, (b) PLA, (c) a chain extender, and (d) a glycidyl methacrylate (GMA) functionalized polyolefin copolymer/terpolymer and method of manufacturing the PC and PLA blend, including blending (i) Bisphenol A PC, (ii) PLA, (iii) a chain extender, and (iv) a glycidyl methacrylate (GMA) functionalized polyolefin copolymer/terpolymer at an elevated temperature, wherein the elevated temperature is between about 250 and 300° C.

18 Claims, 1 Drawing Sheet

FIG. 1A  FIG. 1B

DURABLE HIGH PERFORMANCE HEAT RESISTANT POLYCARBONATE (PC) AND POLYLACTIDE (PLA) BLENDS AND COMPOSITIONS AND METHODS OF MAKING THOSE

FIELD OF THE INVENTION

The present invention relates to blends and composites having significant portion of renewable content. More particularly, the present invention relates to blends of poly(carbonate) and poly(lactic acid) with acrylic core/shell impact modifiers, polybutylene terephthalate (PBT), glass fibers and a number of bio-sourced and mineral fillers having high mechanical properties as well as impact strength and heat resistance.

BACKGROUND OF INVENTION

Polycarbonate (PC) is one of the most important engineering plastics which have high thermal stability and impact resistance. In order to improve its durability and chemical resistance blends of PC and various thermoplastics were developed and successfully used in wide range of applications. Most useful PC-based blends include PC/Acrylonitrile butadiene styrene (ABS), PC/Polybutylene terephthalate (PBT) and PC/Polyethylene terephthalate (PET) blends. Excellent mechanical properties and chemical resistance of these blends enabled their use in number of fields including electrical appliances and automotive applications.

There were a number attempts to introduce bio-based content in PC blends. Most of these attempts were aimed on poly(carbonate) based poly(lactic acid) (PLA) blends. These blends have intrinsic poor interphase compatibility resulting in poor impact strength and low heat deflection temperature. Therefore, research was mostly aimed on compatibilization of PC/PLA blends and improving mechanical properties via introduction of various additives to overcome brittleness and low heat resistance.

United States Patent Publication No. 2014/0235740 discloses a composition containing PLA and PC where talc was added to obtain heat resistant blend. The talc in the range of 2 to 9 wt. % improved heat resistance of the blend while optional added impact modifier increased the impact strength of the blend. The processing was done in the range of temperatures of 200-220° C.

In United States Patent Publication No. 2014/0200295 this composition was further modified to increase its flame retardant properties.

United States Patent Publication No. 2013/0137804 A1 describes a copolymer of polycarbonate used for blending with poly(lactic acid) to obtain a blend with superior impact properties. Polycarbonate used as example in this application had weight average molecular weight in range 27000-38000.

U.S. Pat. No. 5,952,450 describes the use of crosslinked polycarbonate for improving of ductility of the polylactic acid. The crosslinked polycarbonate was synthesized via polycondensation of diol, polyhydric alcohol and carbonic acid diesters.

European patent EP2060606 describes a plant sourced resin composition with improved heat resistance where PLA was used as a bio-based component in blend with polycarbonate.

Japanese patent JP2009051989 introduces a polycarbonate/poly(lactide) blend reinforced by silica up to 5% by weight.

There were a number of studies done in the field of PC/PLA blends and their compartibilization. Wang et al., *Polymer Engineering and Science* 53(6), 1171-1180 (2013) studied blends of PLA and PC where weight average molecular weight of PC was in range of 35000-58000. PC/PLA blends were processed at maximum temperature of 220° C. Researchers found significant drop in impact strength of PLA/PC blends due to poor interphase bonding. In this study the heat deflection of the blends was also negatively affected. Thus, the PLA/PC blends research is mostly concentrated on improving impact strength and heat resistance of the blend via phase modification. Y. Wang et al., *Journal of Applied Polymer Science* 125(2), 402-412 (2012) used poly(butylene succinate-co-lactate) (PBSL) and epoxy (EP) as compatibilizers in the presence of tetrabutylammonium bromide (TBAB) as a catalyst in a PC/PLA blend processed at 220° C. Researchers reported a moderate increase in impact strength in ternary compositions containing up to 20% PBSL and small increase in heat deflection temperature in blends with 10% of epoxy. Nevertheless, these good properties never converged in one blend composition. An attempt to improve mechanical and especially elongational properties of PLA/PC blends was made by V. T. Phuong et al., *Polymer* 55, 4498-4513 (2014). Tetrabutylammonium tetraphenylborate (TBATPB) and triacetin were used in a reactive compatibilization of PLA/PC blends at two temperatures of 210° C. and 230° C. This approach allowed significant increasing of elongational properties of the blend. Kazuhiro Hashima et al., *Polymer* 51, 3934-3939 (2010) investigated PLA/PC blends toughened by blending with hydrogenated styrene-butadiene-styrene block copolymer (SEBS) with the aid of reactive compatibilizer, poly(ethylene-co-glycidyl methacrylate) (EGMA). The processing temperature was 240° C. They were able to manufacture the blend containing 20% of modifiers having high impact strength in the range of 60 kJ/m$^2$ and good elongational properties. This achievement came at expense of lower mechanical properties and reduced HDT. Lee et al., *Polymer Degradation and Stability* 96, 553-560, (2011) studied PC/PLA blends compatibilized by poly(styrene-co-acrylonitrile)-g-maleic anhydride (SAN-g-MAH), poly(ethylene-co-octene) rubber-maleic anhydride (EOR-MAH) and poly(ethylene-co-glycidyl methacrylate) (EGMA). The molecular weight of PC was 38700 and processing temperature was in range of 240-260° C. It was found that PC/PLA blends compatibilized by EGMA showed worst properties and lowest resistance to degradation.

One of the challenges in processing of PLA/PC blends is an elevated temperature needed for processing the blend. Since PLA is prone to degradation at these temperatures, this represents significant hurdle to successful PLA/PC blending. Relatively recently these limitations were overcome by using of chain extenders which allowed blend processing at higher temperatures without risk of degradation. Chain extenders were used in PLA/PC blends with some success. Y. Srithep et al., *Journal of Polymer Engineering* 34(7), 665-672 (2014) used an epoxy-functional styrene acrylic copolymer as a chain extender in PLA/PC blends where PC had a weight average molecular weight of 39000. The processing was done at 240° C. Researchers found a favorable effect of chain extender on heat resistance of the blend while having little to no effect on other mechanical properties of the blend. It was attributed to improving of interfacial adhesion in the blend as a side effect of chain extender reaction with blend components.

Among all other things durability of PC/PLA blends remains one of the priorities for successful blending. Harris and Lee, *Journal of Applied Polymer Science* 128, 2136-2144 (2013) tested commercially available PC/PLA blends and found that all blends exhibited significant loss of mechanical properties after 5 days at 70° C. and 90% of relative humidity. Those blends showed extreme degradation after 14 days of conditioning which resulted in significant loss of mechanical properties and integrity of the samples. Therefore, enhancing the durability of the PC/PLA blends remains a priority.

Overall, while there was significant progress in PLA/PC blend modification, no modification provides balanced mechanical and thermal properties in the blend which might be expected from its components.

There is a need for a PLA/PC composition having excellent mechanical properties as well as excellent heat resistance for durable applications.

SUMMARY OF INVENTION

Polycarbonate (PC)-based blends containing polylactic acid (PLA) and methods of making and using thereof are described herein. Polycarbonate (PC)-based blends containing polylactic acid (PLA) and polybutylene terephthalate (PBT) are described herein. Composites containing the blend of polycarbonate (PC) and polylactic acid (PLA) also described herein.

In one embodiment, the present invention provides a polycarbonate (PC) and poly(lactic acid) (PLA) blend comprising (a) Bisphenol A PC, (b) PLA, (c) a chain extender, and (d) a glyccidyl methacrylate (GMA) functionalized polyolefin copolymer/terpolymer.

In one embodiment of the PC and PLA blend of the present invention, the blend further comprises a mineral filler.

In another embodiment of the PC and PLA blend of the present invention, the PC is a linear PC.

In another embodiment of the PC and PLA blend of the present invention, the PC is a branched PC.

In another embodiment of the PC and PLA blend of the present invention, the GMA functionalized polyolefin copolymer/terpolymer is ethylene-n-butyl acrylate glycidyl methacrylate.

In another embodiment of the PC and PLA blend of the present invention, the GMA functionalized polyolefin copolymer/terpolymer is glycidyl methacrylate-poly(ethylene octane).

In another embodiment, the present invention provides for a heat resistant polycarbonate (PC) and poly(lactic acid) (PLA) blend comprising: (a) Bisphenol A PC, (b) PLA, (c) a chain extender, and (d) a glycidyl methacrylate (GMA) functionalized polyolefin copolymer/terpolymer; wherein if the ingredients are blended at a temperature of about 250-300° C. before shaping into a plastic article, then the blend after shaping into the plastic article has a heat deflection temperature increase substantially similar to or higher than the heat deflection temperature of the PC alone, when both the composite and the PC are measured at 0.455 MPa using the protocol of ASTM D648.

In one embodiment of the heat resistant PC and PLA blend of the present invention, the blend further comprises a mineral filler.

In another embodiment of the heat resistant PC and PLA blend of the present invention, the GMA functionalized polyolefin copolymer/terpolymer is ethylene-n-butyl acrylate glycidyl methacrylate.

In another embodiment of the heat resistant PC and PLA blend of the present invention, the GMA functionalized polyolefin copolymer/terpolymer is glycidyl methacrylate-poly(ethylene octane).

In another embodiment of the heat resistant PC and PLA blend of the present invention, the Bisphenol A PC is a linear PC.

In another embodiment of the heat resistant PC and PLA blend of the present invention, the Bisphenol A PC is a branched PC.

In another embodiment, the present invention provides for a polycarbonate (PC) and poly(lactic acid) (PLA) blend comprising: (a) Bisphenol A PC, (b) PLA, (c) a chain extender, and (d) a glycidyl methacrylate (GMA) functionalized polyolefin copolymer/terpolymer; wherein if the ingredients are blended at a temperature of about 250-300° C. before shaping into a plastic article, then the blend after shaping into the plastic article has an impact strength substantially similar to or higher than the impact strength of the PC alone, when both the composite and the PC are measured at 0.455 MPa using the protocol of ASTM D 256.

In one embodiment of the heat resistant PC and PLA blend of the present invention, the blend further comprises a mineral filler.

In one embodiment of the PC and PLA blend of the previous embodiment, the GMA functionalized polyolefin copolymer/terpolymer is ethylene-n-butyl acrylate glycidyl methacrylate.

In another embodiment of the PC and PLA blend of this embodiment, the GMA functionalized polyolefin copolymer/terpolymer is glycidyl methacrylate-poly(ethylene octane).

In another embodiment of the PC and PLA blend of this embodiment, the Bisphenol A PC is a linear PC.

In another embodiment of the PC and PLA blend of this embodiment, the Bisphenol A PC is a branched PC.

The present invention, in another embodiment, provides for a polycarbonate (PC) and poly(lactic acid) (PLA) blend comprising (a) Bisphenol A PC, (b) PLA, (c) a chain extender, and (d) a glycidyl methacrylate (GMA) functionalized polyolefin copolymer/terpolymer, (e) polybutylene terephthalate (PBT) wherein the Bisphenol A PC is a linear PC.

The present invention, in another embodiment, provides for a polycarbonate (PC) and poly(lactic acid) (PLA) blend comprising (a) Bisphenol A PC, (b) PLA, (c) a chain extender, and (d) a glycidyl methacrylate (GMA) functionalized polyolefin copolymer/terpolymer, (e) polybutylene terephthalate (PBT) wherein the Bisphenol A PC is a branched PC.

In one embodiment of PC and PLA blends according to any of the previous embodiments, the blend comprises the mineral filler in the range of about 1 wt. % to about 25 wt. %.

In one embodiment of PC and PLA blends according to any of the previous embodiments, the mineral filler is glass fiber.

In one embodiment of PC and PLA blends according to any of the previous embodiments, the mineral filler is calcium carbonate, naturally sourced or chemically precipitated.

In one embodiment of PC and PLA blends according to any of the previous embodiments, the mineral filler is talc, including surface treated (modified) talc.

In one embodiment of PC and PLA blends according to any of the previous embodiments, the mineral filler is nanoclay, including surface treated (modified) nanoclay.

In one embodiment of PC and PLA blends according to any of the previous embodiments, the mineral filler is made from pyrolized biomass in the range of about 1 wt. % to about 15 wt. %.

In one embodiment of PC and PLA blends according to any of the previous embodiments, the blend comprises about 30-95 wt. % of bisphenol A PC, about 5-50 wt. % of PLA, about 1-15 wt. % of the functionalized polyolefin copolymer/terpolymer and about 0.1-1.5 wt. % of the chain extender.

In one embodiment of PC and PLA blends according to any of the previous embodiments, the PC and/or PLA are obtained from post-consumer or post-industrial sources.

In one embodiment of PC and PLA blends according to any of the previous embodiments, the PC and PLA blend is Acrylonitrile butadiene styrene (ABS) free.

In another embodiment, the present invention provides for an article manufactured using the PC and PLA blend of any of the previous embodiments.

In another embodiment, the present invention provides for a method of manufacturing a high performance polycarbonate (PC) and poly(lactic acid) (PLA) blend, the method includes blending (i) Bisphenol A PC, (ii) PLA, (iii) a chain extender, and (iv) a glycidyl methacrylate (GMA) functionalized polyolefin copolymer/terpolymer at an elevated temperature, wherein the elevated temperature is between about 250° C. and about 300° C.

In another embodiment, the present invention provides for a method of manufacturing a high performance polycarbonate (PC) and poly(lactic acid) (PLA) blend, the method including blending (i) Bisphenol A PC, (ii) PLA, (iii) a chain extender, and (iv) a glycidyl methacrylate (GMA) functionalized polyolefin copolymer/terpolymer at an elevated temperature, wherein the PC is a branched PC.

In one embodiment of the methods of the present invention, the method further includes blending mineral filler.

In another embodiment of the methods of the present invention, the methods inlcudes blending about 30-95 wt. % of the bisphenol A PC, about 5-50 wt. % of the PLA, about 2-15 wt. % of the functionalized polyolefin copolymer/terpolymer and about 0.1-1.5 wt. % of the chain extender.

The present invention, in another embodiment, provides for an article manufactured using the PC and PLA blend obtained from the methods according to any of the previous embodiments.

The present invention, in another embodiment, is a master batch comprising biocarbon, polycarbonate (PC) and poly(lactic acid) (PLA).

In one embodiment of the master batch of the present invention, the master batch includes about 50 wt. % biocarbon, and about 50 wt. % of a PC and PLA blend.

BRIEF DESCRIPTION OF THE DRAWINGS

Embodiments will be described, by the way example only, with the reference to the drawings, in which:

FIG. 1A demonstrates co-continuous phase morphology of the polycarbonate-poly(lactic acid) blend.

DETAILED DESCRIPTION OF INVENTION

I. Definitions

Unless defined otherwise, all technical and scientific terms used herein have the same meaning as commonly understood by one of ordinary skill in the art to which this invention belongs. Also, unless indicated otherwise, except within the claims, the use of "or" includes "and" and vice versa. Non-limiting terms are not to be construed as limiting unless expressly stated or the context clearly indicates otherwise (for example "including", "having" and "comprising" typically indicate "including without limitation"). Singular forms included in the claims such as "a", "an" and "the" include the plural reference unless expressly stated otherwise. All relevant references, including patents, patent applications; government publications, government regulations, and academic literature are hereinafter detailed and incorporated by reference in their entireties. In order to aid in the understanding and preparation of the within invention, the following illustrative, non-limiting, examples are provided.

The term "about" modifying any amount refers to the variation in that amount encountered in real world conditions of producing materials such as polymers or composite materials, e.g., in the lab, pilot plant, or production facility. For example, an amount of an ingredient employed in a mixture when modified by about includes the variation and degree of care typically employed in measuring in a plant or lab producing a material or polymer. For example, the amount of a component of a product when modified by about includes the variation between batches in a plant or lab and the variation inherent in the analytical method. Whether or not modified by about, the amounts include equivalents to those amounts. Any quantity stated herein and modified by "about" can also be employed in the present invention as the amount not modified by about.

The prefix "bio-" is used in this document to designate a material that has been derived from a renewable resource.

"Biochar", as used herein, refers to the material obtained from the pyrolysis of biomass, such as plant fibers, agricultural/forest biomass, municipal solid waste (MSW), and/or animal/bird manures, etc. The pyrolysis is typically performed above about 475° C.

"Master batch", as used herein, refers to a mixture or blend of filler (e.g., biochar) and plastic, typically prepared by extrusion, which is added to a plastic to form the final composite. The master batch can be used to control the dosage and dispersion when added in the desired ratio during extrusion or injection molding of the final composite materials. The master batch may contain one or more additives, such as impact modifiers.

The term "wt. %" refers to the weight percent of a component in the composite formulation with respect to the weight of the whole composite formulation.

"Blend", as used herein, means a macro-homogeneous mixture of two or more different polymers. The resultant blend may or may not contain distinct phases of its components.

The terms "heat deflection temperature" or "heat distortion temperature" (HDT) are used interchangeably and refer to the temperature at which a polymer or plastic sample deforms under a specified standard load. The heat distortion temperature is determined by the following test procedure outlined in ASTM D648. The test specimen is loaded in three-point bending in the edgewise direction. The two most common loads are 0.455 MPa or 1.82 MPa and the temperature is increased at 2° C./min until the specimen deflects by 0.25 mm over 50 mm span.

"Impact strength", as used herein, refers to the capability of a material to withstand a suddenly applied load or impact and is expressed in terms of energy. Impact strength is typically measured with the Izod impact strength test or Charpy impact test, both of which measure the impact energy required to fracture a sample. Izod impact testing is an ASTM standard method of determining the impact resistance of materials. An arm held at a specific height (constant potential energy) is released. The arm hits the sample and breaks it. From the energy absorbed by the sample, its impact energy is determined. A notched sample is generally used to determine impact energy and notch sensitivity.

The terms "super tough" and "non-breakable" are used interchangeably and refer to a polymer blend which shows a no break notched Izod impact behavior, as determined according to ASTM Standard D256.

The term "non-break", as used herein, refers to an incomplete break where the fracture extends less than 90% of the distance between the vertex of the notch and the opposite side as per ASTM D256. Results obtained from the non-break specimens shall not be reported as per ASTM D256.

II. Poly(Lactic Acid) Containing Polycarbonate Blends

High impact strength blends of poly(lactic acid) and polycarbonate having excellent heat resistance have been developed. In addition, PLA/PC blends further enhanced by mineral fillers have also been developed.

In one embodiment, the polycarbonate-polylactic acid blend may include (a) a poly(lactic acid) resin, (b) bisphenol A polycarbonate (c) Multi-functional reactive polymer with epoxy groups having a chain extender functionality relative to poly(lactic acid) (d) a glycidyl methacrylate functionalized polyolefin terpolymer (e) optional polybutylene terephthalate (PBT) (f) optional mineral filler.

The content of different components in PLA/PC blend in present invention may vary in wide ranges as long as resulting blend has a desirable combination of mechanical properties and heat resistance.

A. Poly(Lactic Acid) (PLA)

The PLA may be commercially available or synthesized resin made from lactic acid. The copolymers of poly(lactic acid) also may be used for blending. PLA may also be random copolymer of L-lactic and D-lactic acid. The stereo complex of poly(L-lactide) and poly(D-lactide) may also be used in this invention. The number-average molecular weight of poly(lactic acid) may be in the range of 50000-450000 while polydispersity index may be in the range of 1-3. The polylactic acid having the molecular weight in the range of 100000-250000 is preferred from melt viscosity considerations.

In one embodiment of the present invention a post-consumer or post-industrial waste PLA also may be used instead of virgin PLA. PLA in blends may constitute from about 5 to about 90% by weight. The content of about 20-50% PLA by weight may be preferred as ensuring the best combination of mechanical properties and heat resistance. As such, the amount of PLA in the blends of the present invention may include (% by weight) 5%, 6%, 7%, 8%, 9%, 10%, 15%, 20%, 25%, 30%, 35%, 40%, 45%, 50%, 55%, 60%, 65%, 70%, 75%, 80%, 85% or 90%, and any unit in between, for example, X1, X2, X3, X4, X6, X7, X8 and X9%, wherein "X" is an integer between 1 and 8.

B. Polycarbonate (PC)

Polycarbonate may be any commercially available resin made from Bisphenol A. The number average molecular weight of polycarbonate may be in the range of 9000-65000 and polydispersity index of 1 to 2.5. Any grade of polycarbonate can be used in this invention. Branched (extrusion grade) PC and linear (injection grade) PC may be used. The branched extrusion grade polycarbonate may be preferred as giving better interphase adhesion with PLA phase and superior mechanical properties as well as impact strength. The amount of PC in the blend of the present invention may include between about 30 wt. % and about 95 wt. % including 30%, 35%, 40%, 45%, 50%, 55%, 60%, 65%, 70%, 75%, 80%, 85%, 90%, 91, 92, 93, 94, or 95 wt. %, and any unit in between, for example, X1, X2, X3, X4, X6, X7 and X8, wherein "X" is an integer between 1 and 8.

C. Polybutylene terephthalate (PBT)

Polybutylene terephthalate (PBT) may be any commercially available resin.

D. Chain Extender

The multi-functional reactive polymer with epoxy groups available under trade name of Joncryl ADP-4368C and manufactured by BASF may be used as a chain extender. It may be used both in powder and flake form for premixing in dry blends as well as in liquid form directly during reactive blending. The amount of chain extender in the blends of the present invention may be in the range of about 0.1 wt. % to about 1.5 wt. % regarding to total blend weight, including 0.2, 0.3, 0.4, 0.5, 0.6, 0.7, 0.8, 0.9, 1, 1.1, 1.2, 1.3 and 1.4 wt. %. The chain extender amount of in the range from about 0.1 wt. % to about 0.5 wt. % is preferred.

The following chemical substances may be used as a chain extenders for PLA in polymer blends in this invention: hexamethylene diisocyanate (HDI), pyromellitic dianhydride (PMDA), tris(nonyl phenyl)phosphite (TNPP). The amount of each chain extender used may vary depending on poly(lactic acid) content and type of chain extender used.

E. Functionalized Polyolefin Copolymer/Terpolymer

The functionalized polyolefin copolymer/terpolymer may be used as one of the glycidyl methacrylate (GMA) functionalized polyolefin copolymer and may include any of the following functional groups in various weight ratios regarding to composition: ethylene/n-butyl acrylate/glycidyl methacrylate, ethylene/methyl acrylate/glycidil methacrylate, ethylene/glycidyl acrylate, glycidyl methacrylate-poly(ethylene octane). An ethylene/n-butyl acrylate/glycidyl methacrylate available under trade name Elvaloy PTW manufactured by DuPont is preferred as the most efficient.

The content of functionalized terpolymer or copolymer in PC/PLA blend of the present invention may be between about 1 percent by weight and about 15 percent by weight with respect to overall weight of the blend. The suggested content of impact modifier would depend on PLA content of the blend and is preferably between about 3 wt. % and about 15 wt. % with regard to content of poly(lactide) in the blend.

Wt. % of the functionalized terpolymer or copolymer may be no more than 15 wt. %, including 1, 2, 3, 4, 5, 6, 7, 8, 9, 10, 11, 12, 13, 14 or 15%.

F. Hydrolytic Stabilizer

In some embodiments, the blend of present invention includes one or more hydrolytic stabilizers. "Hydrolytic stabilizer". As used herein, refers to an additive introduced to improve durability of the blend for applications requiring increased weather resistance. In particular embodiments, the hydrolytic stabilizer is an additive containing carbodiimide functional group such as available under trade name BioAdimide® 500XT and BioAdimide® 100. The concentration of hydrolytic stabilizer in durable blends may vary. In some embodiments, the concentration of the hydrolytic stabilizer may be from about 0.1 wt. % to about 2.0 wt. % of composition and any range in between, for example from about 0.3 wt. % to about 1.5 wt. % of the composition. BioAdimide® 500XT and BioAdimide® 100 are shown to improve processeability and durability of PLA, however their efficiency has been not described in PC/PLA blends as well as any other blends.

G. Properties of the Blends

Blends compositions described herein exhibit similar or improved mechanical properties compared to neat PC of two different grades. A summary of various mechanical properties for unmodified PC and exemplary blends of the present invention is shown in Example 1. Many blends of the present invention exhibit improved Notched Izod Impact Strength compared to unmodified PC, as well as similar or improved tensile strength and improved flexural strength and elasticity.

III. Composites

Blends described herein can be used to prepare PC/PLA-based composites. The composites may be prepared by combining the blends described herein with one or more additives selected from fillers, such as natural fibers, biochar and/or mineral fillers to form the composites.

A. Mineral Fillers/Fibers

In the present invention mineral filler may be any filler used to obtain polymer composites with enhanced mechanical properties and heat resistance. Mineral fillers used in this invention may be bio-sourced fillers such as pyrolized biomass known as biochar in content by weight from 0% to 20%. Other examples of mineral fillers used may include carbon black, silica, glass fiber, talc, calcium sulphate, mica, calcium carbonate sourced both from natural sources and chemically synthesized for this purpose. The blend also may contain other mineral fillers not listed in present invention and combination of the various mineral fillers.

The mineral filler may be in the form of particles or fibers. An example of fiber may include glass fibre having various length to diameter ratios or carbon fibre.

The content of the mineral fillers/fibers in the composite may be from about 0 wt. % to about 30 wt. % and any range in between, such as from about 0 wt. % to about 25 wt. % of the composite, more preferably from about 0 wt. % to about 20 wt. %, most preferably from about 0 wt. % to about 10 wt. %. When the natural fibers are present, the concentration can be from about 10 wt. % to about 30 wt. % of the composite, preferably from about 10 wt. % to about 25 wt. % of the composite, more preferably from about 10 wt. % to about 20 wt. % of the composite.

The use of natural fiber also reduces the cost of the final formulation, as up to 30 wt. % of the composite can be replaced with these fibers as per the property requirements of the end product.

IV. Methods of Manufacturing PC/PLA-Based Blends and Composites Containing the Blends A. Blends The present invention is also directed to methods of manufacturing of high performance polycarbonate-poly(lactic acid) blends. A method of manufacturing of polycarbonate—poly(lactic acid) blend in one embodiment, may include a forming an extrudate of (a) Bisphenol A polycarbonate, (b) poly(lactic acid), (c) chain extender, (d) an impact modifier, (e) polybutylene terephthalate, (f) optional mineral filler.

The polycarbonate and poly(lactic acid) may both form co-continuous phases with some poly(lactic acid) droplets dispersed inside polycarbonate phase. An impact modifier may form fine droplets dispersed uniformly in poly(lactic acid) phase alone or may be dispersed in both phases.

In one embodiment of the method the polymer blend components are mixed in a compounder capable of producing high shear rates in polymer melt to achieve more uniform size distribution of the impact modifier and its overall lower droplet size.

In another embodiment of the method of the present invention, the method includes blending of components at elevated temperatures in the range of about 250° C. to about 300° C. for better blend compatibilization to achieve the best properties, for example, 250° C., 255° C., 260° C., 261° C., 262° C., 263° C., 264° C., 265° C., 266° C., 267° C., 268° C., 269° C., 270° C., 275° C., 280° C., 285° C., 290° C., 295° C. and 300° C. The processing temperature of about 260° C. to about 270° C. is preferred. In this embodiment of invention the unusually high processing temperature for polymer blends containing poly(lactic acid) is used to achieve excellent heat resistance of the blend via acceleration of reactive blending. The obtained blend using this method may be further pelletized for subsequent use to form articles for consumer durable applications.

The method may further include an injection molding of extrudate to obtain molded articles and parts for consumer durable applications having excellent mechanical properties and superior heat resistance.

The method of manufacturing a product in this invention may include a manufacturing articles from above-described blends and composites by injection molding, extrusion molding, blow molding, compression molding etc.

In another embodiment of the method of the present invention, the method further includes manufacturing of the articles by various techniques of injection molding from the pellets manufactured by method described above at temperatures in the range of about 210° C. to about 250° C. to preserve polymer blends' internal structure and properties.

B. Composites

The composites of blends in this invention can be prepared using techniques known in the art. The blend can be dried or otherwise conditioned according to requirements prior to extrusion to form the composite. In some embodiments, the blend is dried at a temperature from about 50° C. to about 90° C. for a period of time from about 6 to about 12 hours.

In one embodiment, the composites are prepared by co-extruding a blend containing, with at least one filler (fibers and/or mineral fillers, and/or natural fillers, and/or biochar), acrylic impact modifier, hydrolytic stabilizer, and/or chain extender. In those embodiments where the filler is or contains one or more fibers, the fiber may be added to the PC/PLA blend directly without any surface treatment to achieve the desired performance or it may be surface treated to improve adhesion between matrix and fiber. Following extrusion, the extruded pellets can be dried, for example at 60° C. for at least 12 hours.

In some embodiments, the PLA-based blend forms a matrix or continuous phase of the composite and the fillers and/or other additives form a dispersed phase.

The method may further include injection molding of the extrudate. The PLA-based composites may be used for manufacturing a molded article or product having enhanced impact strength exceeding that of PC and commercial PC/ABS blends and HDT close to that within 5° C. range of neat or virgin PC. The method of manufacturing a molded product may include a step of molding the above-described composites by injection molding, extrusion molding, blow molding, vacuum molding, compression molding, etc. The injection molding conditions may vary. However, in some embodiments, the injection molding conditions may be as follows: melt temperature from about 210° C. to about 250° C., mold temperature from about 30° C. to about 60° C., and cooling time from about 20 seconds to about 60 seconds.

Lab scale extrusion and injection molding can be done using a variety of equipment known in the art. In some embodiments, lab scale extrusions and injection moldings were performed on a micro twin-screw extruder and micro injection machine (DSM Research, Netherlands). The screw configuration in the extruder was co-rotating and was operated at a 100 RPM and 150 RPM in some occasions. Pilot scale extrusion can be carried out in a co-rotating twin-screw extruder (Leistritz, US) with a screw diameter of 27 mm. Two component injection molding machine (Arburg, Germany) can be used for the pilot scale injection molding.

V. Methods of Using the Composites

The composites described herein can be used to prepare an article of manufacture that is made from plastics and or plastic/mineral fillers and fibers. Examples include but are not limited to, injection molded articles, such as car parts, toys, consumer products, building materials, etc.

In one embodiment, the composites may contain up to 60 wt. % bio-based content. The PC-based composites may be derived from a combination of a renewable (e.g., derived from a renewable resource) material along with a recycled material, a regrind material, or mixtures thereof. In some embodiments, the composite contains one or more fillers, such as fibers and/or mineral fillers.

VI. Advantages of Using PC/PLA Blends of the Present Invention

Blending at elevated temperatures (above about 250° C. to about 300° C.) allows to produce polycarbonate poly(lactic acid) blend having excellent impact strength and heat deflection temperature (HDT) rivaling or exceeding that of neat polycarbonate opening possibilities to wide range of applications. The blending in the range of temperatures from 260° C. to 270° C. allows increasing of impact strength by ~60% as compared to 220° C. to 240° C. range typically used in the prior art for processing PC/PLA blends.

The use of branched polycarbonate instead of linear polycarbonate in blends allows about 50% increase in impact strength of the blend while decreasing impact modifier content from about 6-8 wt. % to about 1-3 wt. %.

Ultra-low content of impact modifier in the range of 1-3 wt. % used in blends based on branched PC allows increasing the heat deflection temperature and mechanical properties.

The use of branched polycarbonate instead of linear polycarbonate in blends allows an increase polylactic acid content in PC/PLA blends while maintaining excellent mechanical properties.

The use of PC/PLA blends based on branched PC in form of glass fiber filled composites allows obtaining composites having excellent elasticity and impact strength as compared to blends based on linear PC.

The methods of the present invention lead to manufacturing of polycarbonate-poly(lactic acid) blends having excellent mechanical properties significantly exceeding current analogues manufactured.

An enhanced durability of the blends manufactured by addition of hydrolytic stabilizers allows increasing durability at least 7 times as compared to unmodified blends with little to no impact on mechanical properties and heat resistance. This expands the field of application for polycarbonate—poly(lactic acid) blends to more durable and weather resistant articles.

Both polycarbonate and poly(lactic acid) form continuous phases till up to 36 wt. % PLA content allowing the blend to have high heat resistance comparable to neat PC.

Impact modifier droplets being fine dispersed in PLA phase, is more efficient because of the distribution in almost exclusively brittle phase. The limited to brittle phase impact modifier distribution allows dramatically decrease amount of impact modifier necessary for efficient impact modification. Thus, higher toughness can be achieved with much smaller amounts of additive than when non-selective to phases modifier is used. That is, this distribution selectivity of the impact modifier within the PLA phase allows adding relatively small amounts of impact modifier to achieve excellent impact properties and diminish negative effects of impact modifier on mechanical properties and heat resistance.

High temperature of processing helps distribution of modifier in polycarbonate-poly(lactic acid) interface to enhance interphase strength and simultaneously increasing blends durability due to increased barrier properties of newly formed interface.

An increased acceptable processing temperature of the blends manufactured using the methods of the present invention allow decreasing of manufacturing costs due to the increased flowability of the melt.

Moderate PBT addition to PC/PLA blends in amounts of up to 12 wt. % allows significantly improve all mechanical properties of the blend with little decrease of impact strength and some decrease in heat deflection temperature.

In order to aid in the understanding and preparation of the present invention, the following illustrative, non-limiting examples are provided.

EXAMPLES

A. Materials, Trade Names and Manufacturers

In Table 1 listed are the materials used to produce example samples as well as trade names and manufacturers.

TABLE 1

Materials used for examples, brands and suppliers

| # | Chemical name | Trade name | Manufacturer |
|---|---|---|---|
| 1 | Poly(lactic acid) (PLA) | Ingeo Biopolymer 3251D | NatureWorks LLC |
| 2 | Polycarbonate (PC) (high MFI) injection grade (IG) | Hylex P1025L1HB | ENTEC Polymers |
| 3 | Branched polycarbonate (PC) (low MFI) extrusion grade (EG) | Hylex P1302B3 | ENTEC Polymers |
| 4 | Polybutylene terephthalate (PBT) | Celanex 2000-3 | Celanese |
| 5 | Multi-functional reactive polymer with epoxy groups | Joncryl ADP-4368C | BASF |
| 6 | Poly(ethylene/n-butyl acrylate/glycidyl methacrylate copolymer) (EBA-GMA) | Elvaloy PTW | DuPont Co. |
| 7 | Carbodiimide hydrolytic stabilizer | BioAdimide 500XT | ReinChemie Additives |
| 8 | Surface modified talc | Mistron CB | Luzenac America Inc. |
| 9 | Chopped sized glass fiber (sized for nylon) | 3610HP | PPG Industries |
| 10 | Pyrolized biomass | Biochar | CGtech Co. |

B. Lab Scale Processing of Blends and Composites

Polycarbonate (PC) and poly(lactic acid) (PLA) were dried in a drying oven at 80° C. for 12 hours before processing. Because of low melting temperature of EBA-GMA (Elvaloy PTW) and multi-functional reactive polymer with epoxy groups (Joncryl) these components were used without prior drying but measures were taken to limit humidity intake by storing the components in hermetic containers. Biochar was dried for 24 hours at 105° C. and talc was dried at 60° C. for 12 hours. Joncryl was powdered in hand mill and dry mixed with PLA pellets using hand tumble mixer. Additives such as chain extender and hydrolytic stabilizer were dry mixed in hand drums with polymer pellets. The compositions of blends used in Examples Section are given in Table 2 below.

TABLE 2

Examples compositions

| Example # | Composition | Poly(lactic acid), wt. % | Polycarbonate (IG) wt. % | Polycarbonate (EG) wt. % | EBA-GMA wt. % | Chain extender, phr |
|---|---|---|---|---|---|---|
| 1A | Blend 1 | 45.0 | 46.0 | | 9.0 | 0.3 |
| 1B | Blend 2 | 45.0 | | 46.0 | 9.0 | 0.3 |
| 1C | Blend 3 | 40.0 | 52.0 | | 8.0 | 0.3 |
| 1D | Blend 4 | 40.0 | | 52.0 | 8.0 | 0.3 |
| 1E | Blend 5 | 32.0 | 68.0 | | 0.0 | 0.3 |
| 1F | Blend 6 | 32.0 | 65.0 | | 3.0 | 0.3 |
| 1G | Blend 7 | 32.0 | | 65.0 | 3.0 | 0.3 |
| 1H | Blend 8 | 32.0 | 62.0 | | 6.0 | 0.3 |
| 1I | Blend 9 | 32.0 | | 62.0 | 6.0 | 0.3 |
| 1J | Blend 10 | 32.0 | | 62.0 | 6.0 | 0.0 |

The fabrication of composites and blends was made in 15 cc co-rotating twin screw extruder (DSM Research, Netherlands) paired with 12 cc injection molding machine (DSM Research, Netherlands). In other instances manufacturing was done in Leistritz co-rotating twin screw extruder where polymer blend strand was produced followed by strand pelletizing. After drying at 80° C. for 12 hours polymer blend pellets were formed in test samples in 77 t Arburg Allrounder 370 injection molding machine. For both sample fabrication routines ASTM Type IV test samples were produced.

C. Testing and Characterization

All samples were conditioned at 23 C and 50% of relative humidity for 48 hours prior to testing in accordance with ASTM standard D 618-08. Tensile and flexural properties were measured using Instron instrument (Model 3382) according to ASTM standards D 638 (tensile properties) and D 790 (flexural properties). The tensile specimens were tested at crosshead speeds of 50 mm/min. All flexural samples were tested at 14 mm/min crosshead speed up to 5% of strain. All data for impact strength provided in this disclosure were performed on notched samples fitted for Izod impact strength testing according to ASTM D 256 standard. The TMI notching cutter was used for sample preparation. The impact testing itself was done using TMI 43-02 impact testing machine using 5 ft-lb Izod impact pendulum. In all tests mentioned above 5 identical samples were used for testing except for impact testing were 6 samples were used. The heat resistance of the blends was tested according to ASTM D 648 using Thermal Instruments Q 800 DMA equipment. The three point bend test in controlled force mode was used to determine the heat deflection temperature (HDT) of the material. The temperature ramp rate was 2° C./min and HDT was determined as a temperature at which strain reached 0.1889%. For each formulation two test samples were used.

The hydrolytic environmental durability test was performed in temperature and humidity controlled chamber Envirotronics ENDH340/70 at 70° C. and 90% of relative humidity. Samples were retrieved and tested after certain time intervals. The moisture adsorption was determined by weighing the marked samples before and after test. The samples were conditioned for 48 hours prior to testing in accordance with ASTM standard D 618-08.

Example 1. Preparation of Polycarbonate (PC)/Polylactic Acid (PLA) Blend Containing an Acrylic Terpolymer Impact Modifier and Chain Extender using Lab Scale Equipment Example blend 1A (Blend 1) was prepared containing 46.0 wt. % linear PC (Hylex P1025L1HB ENTEC Polymers), 45.0 wt. % PLA (PLA Ingeo3251D, Nature Works), 9.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 100 RPM screw speed, with a 270° C. extrusion temperature, and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

Example blend 1B (Blend 2) was prepared containing 46.0 wt. % branched PC (Hylex P1302B3 ENTEC Polymers), 45.0 wt. % PLA (PLA Ingeo3251D, Nature Works), 9.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 100 RPM screw speed, with a 270° C. extrusion temperature, and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

Example blend 1C (Blend 3) was prepared containing 52.0 wt. % linear PC (Hylex P1025L1HB ENTEC Polymers), 40.0 wt. % PLA (PLA Ingeo3251D, Nature Works), 8.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 100 RPM screw speed, with a 270° C. extrusion temperature, and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

Example blend 1D (Blend 4) was prepared containing 52.0 wt. % branched PC (Hylex P1302B3 ENTEC Polymers), 40.0 wt. % PLA (PLA Ingeo3251D, Nature Works), 8.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 100 RPM screw speed, with a 270° C. extrusion temperature, and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

Example blend 1E (Blend 5) was prepared containing 68.0 wt. % linear PC (Hylex P1025L1HB ENTEC Polymers), 32.0 wt. % PLA (PLA Ingeo 3251D, Nature Works), and 0.3 phr chain extender (JONCRYL® ADR 4368 (BASF)). The blend was mixed in a DSM Micro 15 cc twin screw compounder at 100 RPM screw speed, with a 270° C. extrusion temperature, and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

Example blend 1F (Blend 6) was prepared containing 65.0 wt. % linear PC (Hylex P1025L1HB ENTEC Polymers), 32.0 wt. % PLA (PLA Ingeo 3251D, Nature Works), 3.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 100 RPM screw speed, with a 270° C. extrusion temperature, and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

Example blend 1G (Blend 7) was prepared containing 65.0 wt. % branched PC (Hylex P1302B3 ENTEC Polymers), 32.0 wt. % PLA (PLA Ingeo 3251D, Nature Works), 3.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 100 RPM screw speed, with a 270° C. extrusion temperature, and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

Example blend 1H (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 100 RPM screw speed, with a 270° C. extrusion temperature, and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

Example blend 1I (Blend 9) was prepared containing 62.0 wt. % branched PC (Hylex P1302B3 ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 150 RPM screw speed, with a 270° C. extrusion temperature, and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

Example blend 1J (Blend 10) was prepared containing 62.0 wt. % branched PC (Hylex P1302B3 ENTEC Polymers), 32.0 wt. % PLA (PLA Ingeo 3251D, Nature Works), 6.0 wt. % acrylic EBA-GMA terpolymer (Elvaloy PTW, DuPont), and no chain extender (JONCRYL® ADR 4368 (BASF)). The blend was mixed in a DSM Micro 15 cc twin screw compounder at 150 RPM screw speed, with a 270° C. extrusion temperature, and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

A comparison of the mechanical and heat resistance properties of neat polymers and the blends formed in Example 1 is shown in Table 3.

Example 2. Preparation of Polycarbonate (PC)/Polylactic Acid (PLA) Blend Containing an Acrylic Terpolymer Impact Modifier and Chain Extender with and without Polybutylene Terephthalate (PBT) Addition using Lab Scale Equipment Example blend 2A (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 205° C. extrusion temperature at 5 kg/hour rate. The retention time was about 1 minute. The extruded strands were pelletized by strand pelletizer. The pre-dried pellets of the blend were molded into test samples using a DSM micro 12 cc mini injection machine. Mixing temperature was 270° C. and blending time was 2 minutes. Injection pressure was 5 bar and holding pressure was 8 bar. Injection time was set to 6 seconds and holding time was 12 seconds.

Example blend 2B (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 205° C. extrusion temperature at 5 kg/hour rate. The retention time was about 1 minute. The extruded strands were pelletized by strand pelletizer. The pre-dried pellets of the blend were mixed 8.0 phr polybutylene terephthalate PBT (Celanex 2000-3 Celanese) and molded into test samples using a DSM micro 12 cc mini injection machine. Mixing temperature was 270° C. and blending time was 2 minutes. Injection pressure was 5 bar and holding pressure was 8 bar. Injection time was set to 6 seconds and holding time was 12 seconds.

Example blend 2C (Blend 7) was prepared containing 65.0 wt. % branched PC (Hylex P1302B3 ENTEC Polymers), 32.0 wt. % PLA (PLA Ingeo 3251D, Nature Works), 3.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 205° C. extrusion temperature at 5 kg/hour rate. The retention time was about 1 minute. The extruded strands were pelletized by strand pelletizer. The pre-dried pellets of the blend were molded into test samples using a DSM micro 12 cc mini injection machine. Mixing temperature was 270° C. and blending time was 2 minutes. Injection pressure was 5 bar and holding pressure was 8 bar. Injection time was set to 6 seconds and holding time was 12 seconds.

Example blend 2D (Blend 7) was prepared containing 65.0 wt. % branched PC (Hylex P1302B3 ENTEC Polymers), 32.0 wt. % PLA (PLA Ingeo 3251D, Nature Works), 3.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 205° C. extrusion temperature at 5 kg/hour rate. The retention time was about 1 minute. The extruded strands were pelletized by strand pelletizer. The pre-dried pellets of the blend were mixed with 8.0 phr polybutylene terephthalate PBT (Celanex 2000-3 Celanese) molded into test samples using a DSM micro 12 cc mini injection machine. Mixing temperature was 270° C. and blending time was 2 minutes. Injection pressure was 5 bar and holding pressure was 8 bar. Injection time was set to 6 seconds and holding time was 12 seconds.

A comparison of the mechanical and heat resistance properties of the blends formed in Example 2 is shown in Table 4.

Example 3. Preparation of Polycarbonate (PC)/Polylactic Acid (PLA) Blend Containing an Acrylic Terpolymer Impact Modifier and Chain Extender Filled with Glass Fibers using Lab Scale Equipment Example blend 3A (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 205° C. extrusion temperature at 5 kg/hour rate. The retention time was about 1 minute. The extruded strands were pelletized by strand pelletizer. The pre-dried pellets of the blend were molded into test samples using a DSM micro 12 cc mini injection machine. Mixing temperature was 270° C. and blending time was 1 minute. Injection pressure was 5 bar and holding pressure was 8 bar. Injection time was set to 6 seconds and holding time was 12 seconds.

Example blend 3B (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 205° C. extrusion temperature at 5 kg/hour rate. The retention time was about 1 minute. The extruded strands were pelletized by strand pelletizer. The pre-dried pellets of the blend were mixed with 2.5 phr chopped sized glass fiber (3.2 mm long) (3610HP PPG Industries) and molded into test samples using a DSM micro 12 cc mini injection machine. Mixing temperature was 270° C. and blending time was 1 minute. Injection pressure was 5 bar and holding pressure was 8 bar. Injection time was set to 6 seconds and holding time was 12 seconds.

Example blend 3C (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 205° C. extrusion temperature at 5 kg/hour rate. The retention time was about 1 minute. The extruded strands were pelletized by strand pelletizer. The pre-dried pellets of the blend were mixed with 5.0 phr chopped sized glass fiber (3.2 mm long) (3610HP PPG Industries) and molded into test samples using a DSM micro 12 cc mini injection machine. Mixing temperature was 270° C. and blending time was 1 minute. Injection pressure was 5 bar and holding pressure was 8 bar. Injection time was set to 6 seconds and holding time was 12 seconds.

Example blend 3D (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 205° C. extrusion temperature at 5 kg/hour rate. The retention time was about 1 minute. The extruded strands were pelletized by strand pelletizer. The pre-dried pellets of the blend were mixed with 10.0 phr chopped sized glass fiber (3.2 mm long) (3610HP PPG Industries) and molded into test samples using a DSM micro 12 cc mini injection machine. Mixing temperature was 270° C. and blending time was 1 minute. Injection pressure was 5 bar and holding pressure was 8 bar. Injection time was set to 6 seconds and holding time was 12 seconds.

Example blend 3E (Blend 7) was prepared containing 65.0 wt. % branched PC (Hylex P1302B3 ENTEC Polymers), 32.0 wt. % PLA (PLA Ingeo 3251D, Nature Works), 3.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 215° C. extrusion temperature at 5 kg/hour rate. The retention time was about 1 minute. The extruded strands were pelletized by strand pelletizer. The pre-dried pellets of the blend were molded into test samples using a DSM micro 12 cc mini injection machine. Mixing temperature was 270° C. and blending time was 1 minute. Injection pressure was 5 bar and holding pressure was 8 bar. Injection time was set to 6 seconds and holding time was 12 seconds.

Example blend 3F (Blend 7) was prepared containing 65.0 wt. % branched PC (Hylex P1302B3 ENTEC Polymers), 32.0 wt. % PLA (PLA Ingeo 3251D, Nature Works), 3.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 215° C. extrusion temperature at 5 kg/hour rate. The retention time was about 1 minute. The extruded strands were pelletized by strand pelletizer. The pre-dried pellets of the blend were mixed with 2.5 phr chopped sized glass fiber (3.2 mm long) (3610HP PPG Industries) and molded into test samples using a DSM micro 12 cc mini injection machine. Mixing temperature was 270° C. and blending time was 1 minute. Injection pressure was 5 bar and holding pressure was 8 bar. Injection time was set to 6 seconds and holding time was 12 seconds.

Example blend 3G (Blend 7) was prepared containing 65.0 wt. % branched PC (Hylex P1302B3 ENTEC Polymers), 32.0 wt. % PLA (PLA Ingeo 3251D, Nature Works), 3.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 215° C. extrusion temperature at 5 kg/hour rate. The retention time was about 1 minute. The extruded strands were pelletized by strand pelletizer. The pre-dried pellets of the blend were mixed with 5.0 phr chopped sized glass fiber (3.2 mm long) (3610HP PPG Industries) and molded into test samples using a DSM micro 12 cc mini injection machine. Mixing temperature was 270° C. and blending time was 1 minute. Injection pressure was 5 bar and holding pressure was 8 bar. Injection time was set to 6 seconds and holding time was 12 seconds.

Example blend 3H (Blend 7) was prepared containing 65.0 wt. % branched PC (Hylex P1302B3 ENTEC Polymers), 32.0 wt. % PLA (PLA Ingeo 3251D, Nature Works), 3.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 215° C. extrusion temperature at 5 kg/hour rate. The retention time was about 1 minute. The extruded strands were pelletized by strand pelletizer. The pre-dried pellets of the blend were mixed with 10.0 phr chopped sized glass fiber (3.2 mm long) (3610HP PPG Industries) and molded into test samples using a DSM micro 12 cc mini injection machine. Mixing temperature was 270° C. and blending time was 1 minute. Injection pressure was 5 bar and holding pressure was 8 bar. Injection time was set to 6 seconds and holding time was 12 seconds.

A comparison of the mechanical and heat resistance properties of the blends formed in Example 3 is shown in Table 5.

Example 4. Preparation of Polycarbonate (PC)/Polylactic Acid (PLA) Blend Containing an Acrylic Terpolymer Impact Modifier and Chain Extender using Pilot Scale Equipment Two blends were prepared: example blend 4A (Blend 8) containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)) and example blend 4B (Blend 7) containing 65.0 wt. % branched PC (Hylex P1302B3 ENTEC Polymers), 32.0 wt. % PLA (PLA Ingeo 3251D, Nature Works), 3.0 wt. % acrylic EBA-GMA terpolymer (Elvaloy PTW, DuPont), and 0.3 phr chain extender (JONCRYL® ADR 4368 (BASF)).

All formulations for this example were extruded in a Leistritz twin screw compounder with 100 RPM screw speed, with a 265° C. mixing and 215° C. extrusion temperature at 5 kg/hour rate. The retention time was about 1 minute. The extruded strands were pelletized by strand pelletizer and dried at 80° C. for at least 12 hours before processing.

The material was molded into test samples using an Arburg Allrounder 370 injection machine. The material was molded with 15 mm/sec injection time, and 45 second cooling time. Injection pressure was 800 bars and mold temperature was 40° C.

A comparison of the mechanical properties the blend formed in Example 4 is shown in Table 6.

Example 5. Preparation of Polycarbonate (PC)/Polylactic Acid (PLA) Blend Containing an Acrylic Terpolymer Impact Modifier and Chain Extender with Fillers Example blend 5A (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 205° C. extrusion temperature at 5 kg/hour rate. The retention time was about 1 minute. The extruded strands were pelletized by strand pelletizer. The pre-dried pellets of the blend were mixed with 10.0 phr of pyrolized biomass (Biochar) (pyrolysis temperature of 500° C., fractioned less than 300 μm, supplied by CGTech Co.) and molded into test samples using a DSM micro 12 cc mini injection machine. Mixing temperature was 270° C. and blending time was 1 minute. Injection pressure was 5 bar and holding pressure was 8 bar. Injection time was set to 6 seconds and holding time was 12 seconds.

Example blend 5B (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in Leistritz pilot scale twin screw extruder at 100 RPM screw speed, with a 265° C. mixing and 205° C. extrusion temperature at 5 kg/hour rate. The retention time was about 1 minute. The extruded strands were pelletized by strand pelletizer. The pre-dried pellets of the blend were mixed with 10.0 phr of talc (Mistron CB, Luzenac America Inc.) and molded into test samples using a DSM micro 12 cc mini injection machine.

Mixing temperature was 270° C. and blending time was 1 minute. Injection pressure was 5 bar and holding pressure was 8 bar. Injection time was set to 6 seconds and holding time was 12 seconds.

A comparison of the mechanical and heat resistance properties of the blends formed in Example 5 is shown in Table 7.

Example 6. Preparation and Environmental Durability Testing of Polycarbonate (PC)/Polylactic Acid (PLA) Blend Containing an Acrylic Terpolymer Impact Modifier, Chain Extender with and without Hydrolytic Stabilizer Two blends were prepared: example blend 6A (Blend 8) containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), 0.3 phr chain extender (JONCRYL® ADR 4368 (BASF)) and example blend 6B (Blend 8) containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), 0.3 phr chain extender (JONCRYL® ADR 4368 (BASF)) and 1.5 phr of hydrolytic stabilizer (Bioadimide® 500XT, Reichemie).

All formulations for this example were extruded in a Leistritz twin screw compounder with 100 RPM screw speed, with a 265° C. mixing and 215° C. extrusion temperature at 5 kg/hour rate. The retention time was about 1 minute. The extruded strands were pelletized by strand pelletizer and dried at 80° C. for at least 12 hours before processing.

The material was molded into test samples using an Arburg Allrounder 370 injection machine. The material was molded with 15 mm/sec injection time, and 45 second cooling time. Injection pressure was 800 bars and mold temperature was 40° C.

Test samples were placed in environmental chamber at 70° C. and 90% relative humidity for accelerated aging and were retrieved for mechanical testing after fixed times. The moisture uptake was determined by weighing the samples before environmental testing and after testing. Samples were conditioned for moisture uptake test at room temperature for 2 hours prior to measurements.

A comparison of the mechanical properties of blends subjected to durability testing formed in Example 6 is shown in Table 8.

Example 7. Preparation of Polycarbonate (PC)/Polylactic Acid (PLA) Blend Containing an Acrylic Terpolymer Impact Modifier and Chain Extender at Different Temperatures Example blend 7A (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 150 RPM screw speed, at different extrusion temperatures from 220° C. to 290° C., and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds.

Example blend 7B (Blend 9) was prepared containing 62.0 wt. % branched PC (Hylex P1302B3 ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 150 RPM screw speed, at different extrusion temperatures from 220° C. to 290° C., and a 2 minute retention time. The extrudate was molded into test samples using a DSM micro 12 cc mini injection machine. Injection pressure was 5 bar and holding pressure was 8 bar. Injection time was set to 6 seconds and holding time was 12 seconds. The data for example 7B at 220° C. blending temperature are not given due to melt's high viscosity which made molding into test samples not possible.

A comparison of the impact strength of blends formed in Example 7 is shown in Table 9.

Example 8. Morphology of High Performance PC/PLA Blends

Example blend 8A and 8B were prepared to provide evidence to the changing morphological structure blends with and without acrylic terpolymer.

Example blend 8A (Blend 5) was prepared containing 68.0 wt. % linear PC (Hylex P1025L1HB ENTEC Polymers), 32.0 wt. % PLA (PLA Ingeo 3251D, Nature Works), and 0.3 phr chain extender (JONCRYL® ADR 4368 (BASF)). The blend was mixed in a DSM Micro 15 cc twin screw compounder at 100 RPM screw speed, with a 270° C. extrusion temperature, and a 2 minute retention time. The extrudate was molded into test samples using a DSM micro 12 cc mini injection machine. Injection pressure was 5 bars and holding pressure was 8 bars. Injection time was set to 6 seconds and holding time was 12 seconds.

Example blend 8B (Blend 8) was prepared containing 62.0 wt. % linear PC (Hylex P1025L1HB ENTEC Polymers), 32.0 wt. % PLA (PLA Ingeo 3251D, Nature Works), 6.0 wt. % acrylic EBA-GMA terpolymer (Elvaloy PTW, DuPont), and 0.3 phr chain extender (JONCRYL® ADR 4368 (BASF)). The blend was mixed in a DSM Micro 15 cc twin screw compounder at 100 RPM screw speed, with a 270° C. extrusion temperature, and a 2 minute retention time. The extrudate was molded into test samples using a DSM micro 12 cc mini injection machine. Injection pressure was 5 bars and holding pressure was 8 bars. Injection time was set to 6 seconds and holding time was 12 seconds.

Figure 1A:
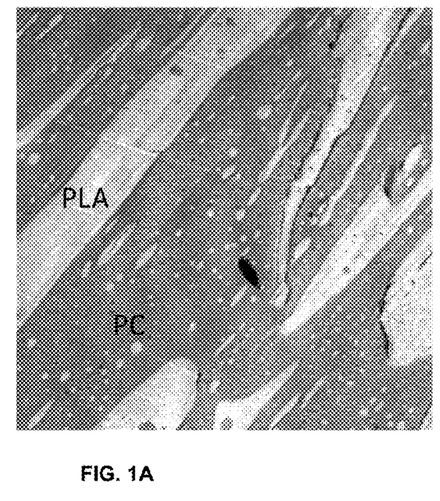
FIG. 1A is an Atomic Force Microscopy 20 μm scan of the microtomed surface of the Blend 5 composition sample (see Table 2). The FIG. 1A represents a modulus image where lighter areas represent PLA phase (higher modulus of about 3.7 GPa) while darker field represents polycarbonate phase (lower modulus of about 2.5 GPa).
Figure 1B:
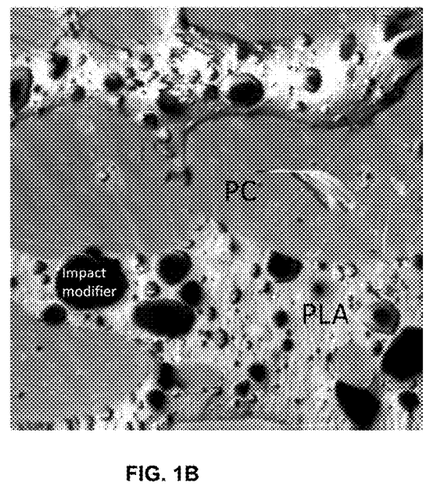
FIG. 1B is an Atomic Force Microscopy 20 μm scan of the microtomed surface of the Blend 8 composition sample (see Table 2). Analogous to FIG. 1A, FIG. 1B demonstrates co-continuous PLA and PC phases where darkest areas are the impact modifier phase having substantially lower modulus of about 0.15 GPa is concentrated predominantly in PLA phase.

All samples were microtomed using Leica UC7 microtome prior to imaging. FIGS. 1A and 1B were taken using a Bruker Multimode atomic force microscope (AFM), and show the so called DLT modulus of the surface. Color in FIGs. represents relative stiffness of the surface making it possible to distinguish between phases. The harder surface is the lighter is the representing color in color map. FIG. 1A shows blend 8A structure, and FIG. 1B shows blend 8B structure. One can see that PLA phase forms a continuous phase in both cases explaining its high heat resistance. In FIG. 1B it can be seen that impact modifier is selectively located in PLA phase making it possible to reach high impact strength with low amounts of impact modifier.

BRIEF DESCRIPTION OF EXAMPLES

The blend in Example 1 exhibit a high Notched Izod Impact Strength and Heat Deflection Temperature compared to neat PC. The blends in Example 1 show advantage of the use of branched PC over linear PC in PC/PLA blends in terms of overall mechanical properties, Notched Impact Strength and Notched Izod Impact Strength. Example 2 shows significant improvement in mechanical properties of the PC based blends with small PBT addition during the processing. Example 3 shows a superior elasticity and enhanced Izod Notched Impact strength of PC/PLA blends filled with glass fiber and based on branched PC as compared to same blends based on linear PC. Example 4 shows the scale up ability of the material, processed under pilot scale equipment. Due to increased shear and finer dispersion of acrylic impact modifier Izod Notched Impact Strength of blends in this invention is significantly higher after pilot scale processing as compared to lab scale processing. Example 5 shows the results of modification of the blends in this invention with biosourced filler called Biochar and mineral filler talc. Example 6 provides an evidence of significant improvement of environmental durability of the PC/PLA blends in this invention after modification with hydrolytic stabilizer. Example 7 provides a proof that Izod Notched Impact Strength of the blends in this invention dependent on blending temperature and temperature range from 260° C.-270° C. results in highest Izod Notched Impact Strength for all samples. Example 8 provides an evidence of morphology changes in blends in this invention introduced by acrylic impact modifier.

TABLE 3

Mechanical properties of the neat materials and PC/PLA blends

| Example # | Formulation | Tensile Strength (MPa) ASTM D 638 | Tensile Modulus (MPa) ASTM D 638 | Flexural Strength (MPa) ASTM D 790 | Flexural Modulus (MPa) ASTM D 790 | Impact Strength (J/m) ASTM D 256 | Elongation at break, % ASTM D638 | HDT ° C. @ 0.455 MPa ASTM D648 |
|---|---|---|---|---|---|---|---|---|
|  | PLA 3251D | 63.7 ± 2.5 | 3650 ± 96 | 107.8 ± 1.7 | 3786 ± 45 | 20 ± 3 | 2.3 ± 0.1 | 55.9 |
|  | PC Hylex P1025L1HB | 59.6 ± 1.0 | 2310 ± 43 | 91.8 ± 1.3 | 2458 ± 29 | 749 ± 31 | 63.4 ± 6.8 | 139.4 |
|  | PC Hylex P1302B3 | 61.9 ± 0.5 | 2540 ± 33 | 95.8 ± 0.4 | 2689 ± 17 | 805 ± 29 | 60.3 ± 13.4 | 140.3 |
|  | PBT Celanex 2000-3 | 51.2 ± 1.8 | 2470 ± 57 | 84.3 ± 0.8 | 2492 ± 7 | 35 ± 11 | 5.7 ± 3.3 | 143.2 |
| 1A | Blend 1 | 50.1 ± 0.8 | 2670 ± 31 | 83.6 ± 1.4 | 2666 ± 75 | 87 ± 19 | 55.1 ± 12.0 | 80.9 |
| 1B | Blend 2 | 50.5 ± 0.6 | 2570 ± 81 | 87.3 ± 0.5 | 2766 ± 14 | 222 ± 18 | 54.2 ± 12.8 | 81.2 |
| 1C | Blend 3 | 48.7 ± 0.1 | 2680 ± 29 | 80.3 ± 1.1 | 2552 ± 26 | 101 ± 22 | 61.3 ± 3.0 | 86.6 |
| 1D | Blend 4 | 53.3 ± 0.4 | 2540 ± 83 | 89.5 ± 1.9 | 2741 ± 68 | 485 ± 53 | 77.7 ± 3.5 | 89.0 |
| 1E | Blend 5 | 60.1 ± 0.4 | 3100 ± 29 | 102.1 ± 0.4 | 2946 ± 21 | 51 ± 19 | 84.4 ± 5.0 | 132.2 |
| 1F | Blend 6 | 55.6 ± 0.4 | 2910 ± 22 | 95.5 ± 0.5 | 2797 ± 16 | 87 ± 19 | 74.2 ± 13.7 | 135.4 |
| 1G | Blend 7 | 61.1 ± 0.9 | 2690 ± 102 | 103.9 ± 0.8 | 3038 ± 26 | 733 ± 186 | 66.5 ± 5.5 | 136.2 |
| 1H | Blend 8 | 51.6 ± 0.7 | 2740 ± 67 | 89.6 ± 0.1 | 2803 ± 33 | 541 ± 43 | 93.1 ± 5.2 | 131.7 |
| 1I | Blend 9 | 56.1 ± 0.1 | 2560 ± 35 | 95.2 ± 1.8 | 2808 ± 34 | 954 ± 251 | 76.7 ± 2.0 | 136.3 |
| 1J | Blend 10 | 53.4 ± 0.9 | 2600 ± 56 | 88.7 ± 3.8 | 2596 ± 126 | 89 ± 10 | 20.8 ± 5.7 | 134.3 |

TABLE 4

Mechanical and heat resistance properties of PC/PLA blends with and without PBT addition

| Example # | Formulation | PBT content, phr | Tensile Strength (MPa) ASTM D 638 | Tensile Modulus (MPa) ASTM D 638 | Flexural Strength (MPa) ASTM D 790 | Flexural Modulus (MPa) ASTM D 790 | Impact Strength (J/m) ASTM D 256 | Elongation at break, % ASTM D638 | HDT ° C. @ 0.455 MPa ASTM D648 |
|---|---|---|---|---|---|---|---|---|---|
| 2A | Blend 8 | 0 | 54.0 ± 0.2 | 2580 ± 18 | 88.8 ± 0.5 | 2679 ± 10 | 504 ± 40 | 75.2 ± 2.8 | 132.2 |
| 2B | Blend 8 | 8 | 58.4 ± 1.2 | 2670 ± 45 | 95.1 ± 0.2 | 2797 ± 6 | 500 ± 26 | 80.1 ± 2.2 | 108.3 |
| 2C | Blend 7 | 0 | 59.6 ± 0.2 | 2800 ± 13 | 97.8 ± 0.4 | 2799 ± 13 | 658 ± 61 | 64.2 ± 0.5 | 136.2 |
| 2D | Blend 7 | 8 | 65.0 ± 0.1 | 2910 ± 26 | 109.2 ± 0.4 | 3212 ± 10 | 520 ± 23 | 75.3 ± 2.2 | 116.1 |

TABLE 5

Mechanical and heat resistance properties of PC/PLA blends filled with glass fiber

| Example # | Formulation | Glass fiber content, phr | Tensile Strength (MPa) ASTM D 638 | Tensile Modulus (MPa) ASTM D 638 | Flexural Strength (MPa) ASTM D 790 | Flexural Modulus (MPa) ASTM D 790 | Impact Strength (J/m) ASTM D 256 | Elongation at break, % ASTM D638 | HDT ° C. @ 0.455 MPa ASTM D648 |
|---|---|---|---|---|---|---|---|---|---|
| 3A | Blend 8 | 0.0 | 54.0 ± 0.2 | 2580 ± 18 | 88.8 ± 0.5 | 2679 ± 10 | 504 ± 40 | 75.2 ± 2.8 | 132.2 |
| 3B | Blend 8 | 2.5 | 68.2 ± 0.9 | 3380 ± 11 | 107.6 ± 1.4 | 3394 ± 48 | 135 ± 11 | 12.6 ± 1.6 | 137.9 |
| 3C | Blend 8 | 5.0 | 73.7 ± 1.1 | 3600 ± 19 | 113.3 ± 2.0 | 3585 ± 75 | 112 ± 2 | 4.5 ± 0.6 | 140.3 |
| 3D | Blend 8 | 10.0 | 83.6 ± 0.7 | 4370 ± 44 | 131.3 ± 0.9 | 4800 ± 4 | 92 ± 3 | 2.9 ± 0.1 | 143.2 |
| 3E | Blend 7 | 0.0 | 59.6 ± 0.2 | 2800 ± 13 | 97.8 ± 0.4 | 2799 ± 13 | 658 ± 61 | 64.2 ± 0.5 | 136.2 |
| 3F | Blend 7 | 2.5 | 65.7 ± 0.4 | 3220 ± 34 | 113.4 ± 1.9 | 3294 ± 67 | 214 ± 24 | 52.9 ± 5.7 | 140.4 |
| 3G | Blend 7 | 5.0 | 72.9 ± 0.4 | 3540 ± 122 | 123.8 ± 1.2 | 3682 ± 65 | 136 ± 5 | 32.1 ± 5.4 | 146.7 |
| 3H | Blend 7 | 10.0 | 86.2 ± 1.7 | 4360 ± 102 | 137.4 ± 5.0 | 4503 ± 269 | 103 ± 4 | 2.8 ± 0.2 | 147.3 |

TABLE 6

Mechanical properties of PC/PLA blend using pilot scale equipment

| Example # | Formulation | Tensile Strength (MPa) ASTM D 638 | Tensile Modulus (MPa) ASTM D 638 | Flexural Strength (MPa) ASTM D 790 | Flexural Modulus (MPa) ASTM D 790 | Impact Strength (J/m) ASTM D 256 | Elongation at break, % ASTM D638 | HDT ° C. @ 0.455 MPa ASTM D648 |
|---|---|---|---|---|---|---|---|---|
| 4A | Blend 8 | 56.8 ± 0.2 | 2710 ± 26 | 92.7 ± 0.2 | 2749 ± 18 | 715 ± 82 | 67.5 ± 4.3 | 133.9 |
| 4B | Blend 7 | 58.7 ± 1.5 | 2630 ± 18 | 94.7 ± 0.8 | 2759 ± 48 | 1192 ± 190 | 74.1 ± 7.8 | 135.2 |

TABLE 7

Mechanical properties of composites of PC/PLA blends

| Example # | Formulation | Filler and content, phr | Tensile Strength (MPa) ASTM D 638 | Tensile Modulus (MPa) ASTM D 638 | Flexural Strength (MPa) ASTM D 790 | Flexural Modulus (MPa) ASTM D 790 | Impact Strength (J/m) ASTM D 256 | Elongation at break, % ASTM D638 | HDT ° C. @ 0.455 MPa ASTM D648 |
|---|---|---|---|---|---|---|---|---|---|
| 5A | Blend 8 | Biochar, 10.0 | 45.0 ± 1.1 | 3340 ± 12 | 73.6 ± 1.1 | 3239 ± 214 | 27 ± 2 | 2.1 ± 0.1 | 121.4 |
| 5B | Blend 8 | Talc, 10.0 | 54.2 ± 0.3 | 2960 ± 19 | 86.3 ± 1.5 | 2723 ± 69 | 108 ± 4 | 40.1 ± 11.2 | 134.3 |

TABLE 8

Environmental degradation test results (70° C. and 90% RH). Comparison of non-modified and modified blends (Prepared via Leistritz-Arburg)

| Example # | Composition | Bioadimide 500XT content, phr | Degradation time, days | Tensile Strength (MPa) ASTM D 638 | Flexural Strength (MPa) ASTM D 790 | Impact Strength (J/m) ASTM D 256 | Elongation at break, % ASTM D638 | Moisture uptake, % |
|---|---|---|---|---|---|---|---|---|
| 6A | Blend 8 | 0 | 0 | 57.3 ± 0.2 | 91.2 ± 0.8 | 821 ± 78 | 60.4 ± 20.4 | 0.000 |
| 6A | Blend 8 | 0 | 3 | 61.3 ± 0.2 | 100.7 ± 0.7 | 601 ± 111 | 25.2 ± 2.5 | 0.298 |
| 6A | Blend 8 | 0 | 5 | 60.1 ± 0.9 | 95.0 ± 2.8 | 81 ± 25 | 3.4 ± 0.6 | 0.398 |
| 6A | Blend 8 | 0 | 7 | 56.0 ± 3.2 | 84.8 ± 1.5 | 27 ± 1 | 3.4 ± 0.6 | 0.398 |
| 6A | Blend 8 | 0 | 14 | 39.6 ± 5.8 | 65.6 ± 0.6 | 21 ± 4 | 1.5 ± 0.2 | 3.662 |
| 6B | Blend 8 | 1.5 | 0 | 54.1 ± 0.6 | 83.9 ± 0.5 | 494 ± 37 | 42.9 ± 21.3 | 0.000 |
| 6B | Blend 8 | 1.5 | 7 | 58.5 ± 0.7 | 99.2 ± 3.8 | 455 ± 49 | 16.0 ± 2.9 | 0.196 |
| 6B | Blend 8 | 1.5 | 14 | 58.5 ± 0.8 | 94.1 ± 0.5 | 395 ± 66 | 15.4 ± 4.1 | 0.176 |
| 6B | Blend 8 | 1.5 | 21 | 59.9 ± 0.3 | 97.4 ± 1.4 | 401 ± 106 | 12.5 ± 3.5 | 0.241 |

TABLE 9

Effect of processing temperature on impact strength

| Blending temperature ° C. | Impact strength (J/m) ASTM D 256 Blend 8 (Example 7A) | Impact strength (J/m) ASTM D 256 Blend 9 (Example 7B) |
|---|---|---|
| 220 | 183 ± 9 | N/D |
| 240 | 459 ± 46 | 597 ± 147 |
| 250 | 511 ± 23 | 846 ± 209 |
| 260 | 634 ± 33 | 974 ± 283 |
| 270 | 683 ± 37 | 954 ± 251 |
| 280 | 636 ± 69 | 814 ± 119 |
| 290 | 576 ± 36 | 765 ± 200 |

Through the embodiments that are illustrated and described, the currently contemplated best mode of making and using the invention is described. Without further elaboration, it is believed that one of ordinary skill in the art can, based on the description presented herein, utilize the present invention to the full extent.

Although the description above contains many specificities, these should not be construed as limiting the scope of the invention, but as merely providing illustrations of some of the presently embodiments of this invention.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

What is claimed is:

1. A polycarbonate (PC) and poly(lactic acid) (PLA) blend comprising (a) branched bisphenol A PC, (b) PLA, (c) a chain extender, and (d) a glycidyl methacrylate (GMA) functionalized polyolefin copolymer/terpolymer.

2. The PC and PLA blend of claim 1, wherein the blend further comprises a mineral filler.

3. The PC and PLA blend of claim 1, wherein the GMA functionalized polyolefin copolymer/terpolymer is ethylene-n-butyl acrylate glycidyl methacrylate.

4. The PC and PLA blend of claim 1, wherein the GMA functionalized polyolefin copolymer/terpolymer is glycidyl methacrylate-poly(ethylene octane).

5. The PC and PLA blend of claim 1, wherein the PC and PLA blend further comprises polybutylene terephthalate (PBT).

6. The PC and PLA blend of claim 2, wherein the blend comprises the mineral filler in the range of about 1 wt. % to about 25 wt. %.

7. The PC and PLA blend of claim 2, wherein the blend comprises about 15 wt. % of the mineral filler or less.

8. The PC and PLA blend of claim 2, wherein the mineral filler is glass fiber.

9. The PC and PLA blend of claim 2, wherein the mineral filler is calcium carbonate, naturally sourced or chemically precipitated.

10. The PC and PLA blend of claim 2, wherein the mineral filler is talc, including surface treated (modified) talc.

11. The PC and PLA blend of claim 2, wherein the mineral filler is nanoclay, including surface treated (modified) nanoclay.

12. The PC and PLA blend of claim 2, wherein the mineral filler is made from pyrolized biomass in the range of about 1 wt. % to about 15 wt. %.

13. The PC and PLA blend of claim 1, wherein the blend comprises about 30-95 wt. % of branched bisphenol A PC, about 5-50 wt. % of PLA, about 1-15 wt. % of the functionalized polyolefin copolymer/terpolymer and about 0.1-1.5 wt. % of the chain extender.

14. The PC and PLA blend of claim 13, wherein the blend further comprises a mineral filler.

15. The PC and PLA blend of claim 14, wherein the mineral filler is glass fiber.

16. The PC and PLA blend of claim 1, wherein the PC and/or PLA are obtained from post-consumer or post-industrial sources.

17. The PC and PLA blend of claim 1, wherein the PC and PLA blend is Acrylonitrile butadiene styrene (ABS) free.

18. The PC and PLA blend of claim 1, wherein each of the PC and the PLA in the blend form continuous phases.

* * * * *